Patented June 19, 1923.

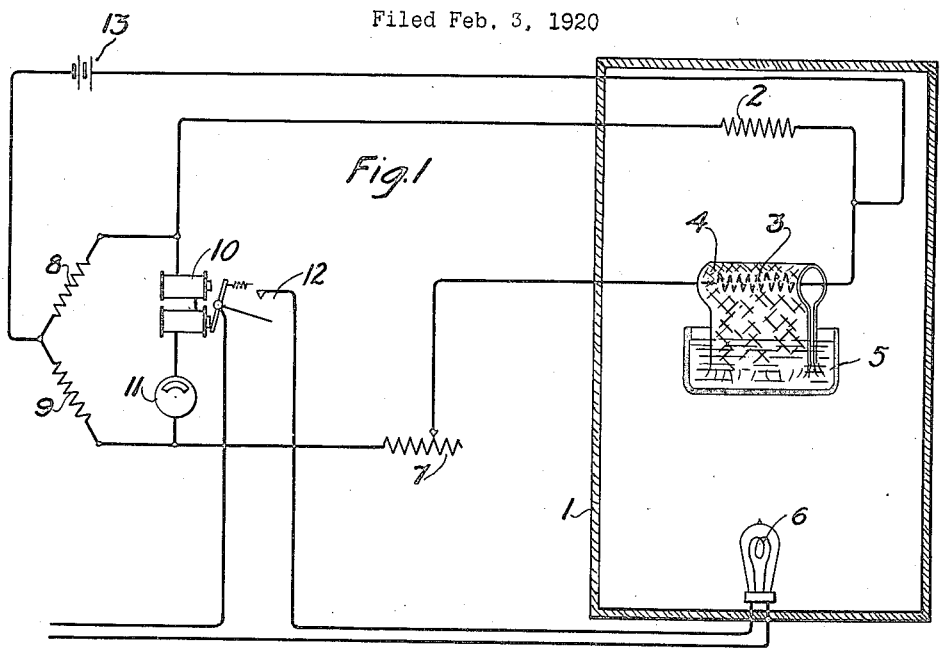
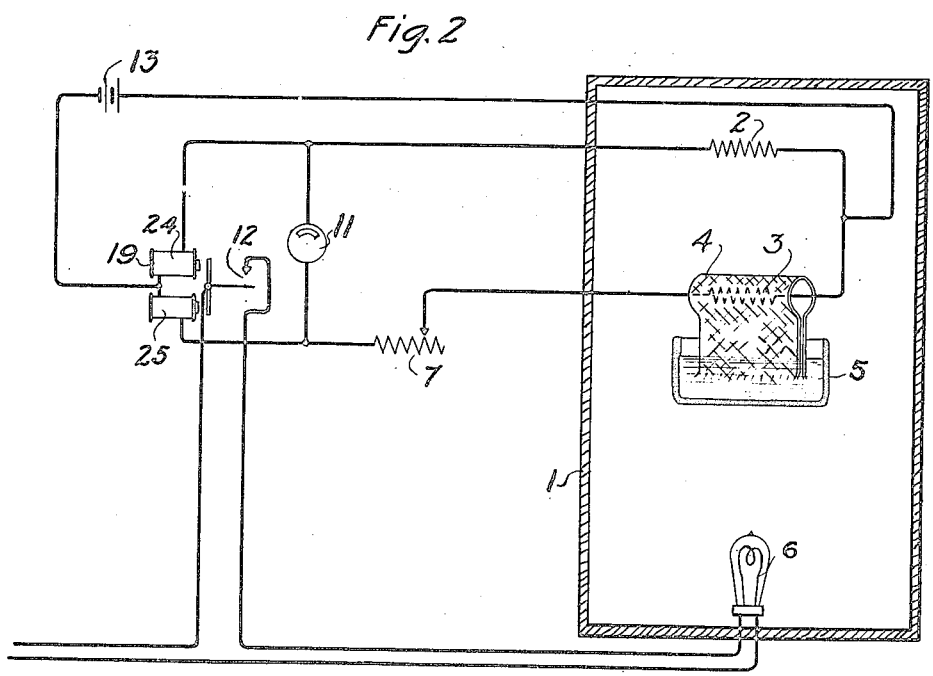

1,459,391

UNITED STATES PATENT OFFICE.

HENRY P. CLAUSEN, OF MAMARONECK, NEW YORK, ASSIGNOR TO WESTERN ELECTRIC COMPANY, INCORPORATED, OF NEW YORK, N. Y., A CORPORATION OF NEW YORK.

HUMIDITY INDICATING AND REGULATING DEVICE.

Application filed February 3, 1920. Serial No. 356,053.

*To all whom it may concern:*

Be it known that I, HENRY P. CLAUSEN, a citizen of the United States, residing at Mamaroneck, in the county of Westchester, State of New York, have invented certain new and useful Improvements in Humidity Indicating and Regulating Devices, of which the following is a full, clear, concise, and exact description.

This invention relates to humidity indicators and regulators and more particularly to an electrical device for indicating and regulating humidity in a building, room or confined space of any nature such as apparatus cabinets and the like.

In tropical countries where the relative humidity is extremely high almost continuously for the greater part of every year, much trouble has been experienced with telephone and telegraph central office equipment on this account and it has been found necessary to provide means for regulating the humidity in those offices. Relative humidity can, of course, be kept reasonably low by heating the central office but this solution is impracticable for the reason that people are required to work in these places and any inordinate application of heat in addition to the extremely high natural temperature of the tropics would mean discomfort for the workers.

The prime object of this invention therefore is to produce means whereby the relative humidity in a room or other enclosure can be controlled. A further object is the provision of means for indicating and recording relative humidity and particularly for indicating at a central point the relative humidity in each of a number of enclosed apparatus cabinets.

In one application of this invention it is proposed to provide enclosed cabinets for the apparatus to be protected. The apparatus is divided into groups or units, each unit having a separate cabinet. An electrical heating device in each cabinet is automatically turned on whenever the relative humidity in the cabinet rises above a definite maximum limit, and turned off when the relative humidity is reduced to a predetermined point. Thus it will be seen that very little heat is required to keep the apparatus cabinets reasonably dry.

The basic feature of this invention comprises the use of two resistance elements in a split circuit, one of said resistance elements being provided with a wick or other means for maintaining it in a moist state. These resistance elements are situated in a room or cabinet where the relative humidity is to be indicated or regulated or, both indicated and regulated.

This invention can be best described by reference to the drawing in which Fig. 1 is a circuit diagram illustrating one application of this invention wherein the two above mentioned resistance elements each form an arm of a Wheatstone bridge circuit and wherein a relay or other electrical operating device for controlling the circuit of an electric heater and a galvanometer or other electrical instrument, calibrated to indicate relative humidity, are inserted in the bridge. Fig. 2 is a circuit diagram illustrating another adaptation of this invention wherein a differential relay is employed in connection with the resistance elements for controlling the circuit of an electric heater.

In Fig. 1, 1 is an apparatus cabinet, 2 is a resistance element forming one arm of a Wheatstone bridge, 3 is a resistance element equipped with a wick 4 dipping into a vessel 5 containing water or other suitable liquid or substance, 6 is an incandescent lamp or an electrical heating device, 7 is an adjustable resistance element, which, together with resistance 3, forms a second arm of the Wheatstone bridge, 8 and 9 are resistance elements, each forming an arm of the Wheatstone bridge, 10 is a biased polarized relay, 11 is a galvanometer or other electrical measuring device, which may or may not be of the recording type, 12 is a contact operable by relay 10 and 13 is a battery supplying current to the bridge. Resistance element 3 is maintained in a moist state by virtue of the wick 4, the lower end of which dips into the water in vessel 5. Resistance element 2 having no wick, is dry. When the relative humidity in the cabinet 1, is low, evaporation from the wick 4 will assist the dissipation of heat from resistance element 3 and thereby maintain the resistance of that element at a lower value than would be the case if its temperature were allowed to rise. The temperature of the dry resistance 2, however, will rise and consequently its resistance value will be increased. When the relative humidity in the cabinet is at a low value, resistance element 7 is adjusted to balance galvanometer 11, and assuming that resistances 8 and 9 are equal, the sum of resistances 7 and 3 will be equal to resistance 2. In other words, the bridge will be balanced, or nearly so, when the relative humidity in the cabinet is low. When the relative humidity rises, evaporation from wick 4 will decrease with a resulting decrease in the rate of dissipation of heat from resistance element 3 and consequently the resistance of that element will rise. This increased resistance of element 3 causes the bridge to become unbalanced resulting in a flow of current through relay 10 and galvanometer 11. When the relative humidity in the cabinet has risen above a certain predetermined value, sufficient current flows through relay 10 to operate it and thereby close contact 12, lighting lamp 6 which will heat and expand the air in the cabinet resulting in a decrease in the relative humidity whereupon evaporation from wick 4 will increase, causing the resistance of element 3 to be reduced thereby restoring the bridge to a state of equilibrium and in turn, causing relay 10 to be restored to normal, breaking contact 12 and extinguishing lamp 6. While the evaporation from wick 4 is sufficient to dissipate considerable heat from resistance element 3, it is not sufficient to materially increase the relative humidity in the cabinet.

When desired, a recording instrument calibrated to indicate and record relative humidity can be substituted for galvanometer 11.

The circuit of Fig. 2 differs from that of Fig. 1 in that the resistance arms 8 and 9 of Fig. 1 are replaced by windings 24 and 25 respectively of the polarized differential relay 19 of Fig. 2 and the galvanometer or indicating instrument 11 is shunted across relay 19. The operation of the circuit of Fig. 2 is as follows: With the relative humidity in the cabinet at a low value, resistance 7 is adjusted so that the sum of its resistance with that of resistance element 3, is less than the resistance of element 2, and therefore a greater current will flow through that branch of the circuit comprising resistance elements 3 and 7 and coil 25 of relay 19, than through that branch of the circuit comprising resistance element 2 and coil 24 of relay 19. Under these conditions relay 19 will be operated to maintain contact 12 open and lamp 6 extinguished. With an increase of relative humidity in cabinet 1, the resistance of element 3 will increase as explained in connection with Fig. 1, and when the relative humidity has risen above a predetermined point, the combined resistance of elements 3 and 7 will exceed the resistance of element 2, and a greater current will flow through coil 24 of relay 19 than through coil 25, and the relay will thereupon be operated to close contact 12 in the circuit of lamp 6, which will thereupon be lighted.

What is claimed is:

1. A humidity responsive device comprising parallel electrical circuits, a dry resistance element in one of said circuits, a wet resistance element in the other of said circuits, each of said elements having a resistance coefficient varying with temperature, means for supplying current to said circuits, an electrical indicating instrument and a switch device both responsive to current ratio fluctuations in said circuits, and an electrical heater, controlled by said switch device.

2. A humidity regulating device comprising parallel electrical circuits, a dry resistance element in one of said circuits, a wet resistance element in the other of said circuits, each of said element having a resistance coefficient varying with temperature, means for supplying current to said circuits, a switch device responsive to current ratio fluctuations in said circuits, and a heater controlled by said switch device, said heater being arranged to heat the air surrounding said wet resistance element.

In witness whereof, I hereunto subscribe my name this 28th day of January A. D., 1920.

HENRY P. CLAUSEN.